United States Patent [19]

Nishiuchi et al.

[11] Patent Number: 5,305,297
[45] Date of Patent: Apr. 19, 1994

[54] METHOD FOR DETERMINING OPTIMUM IRRADIATION CONDITIONS IN OPTICAL DATA RECORDING

[75] Inventors: Kenichi Nishiuchi, Moriguchi; Eiji Ohno; Noboru Yamada, both of Hirakata; Nobuo Akahira, Yahata, all of Japan

[73] Assignee: Matsushita Electric Industrial Co., Ltd., Tokyo, Japan

[21] Appl. No.: 668,478

[22] Filed: Mar. 13, 1991

[30] Foreign Application Priority Data

Mar. 14, 1990 [JP] Japan .................................. 2-63166

[51] Int. Cl.$^5$ .............................................. G11B 7/00
[52] U.S. Cl. .................................. 369/116; 369/100; 369/54
[58] Field of Search ............ 369/100, 124, 116, 44.39, 369/54, 58

[56] References Cited

U.S. PATENT DOCUMENTS

| | | | |
|---|---|---|---|
| 4,698,797 | 10/1987 | Komatsu | 369/116 |
| 4,821,254 | 4/1989 | Satoh et al. | 369/54 |
| 4,937,799 | 6/1990 | Hashimoto | 369/13 |
| 5,043,971 | 8/1991 | Van et al. | 369/124 |
| 5,050,156 | 9/1991 | Barton | 369/116 |
| 5,101,396 | 3/1992 | Takeuchi et al. | 369/116 |
| 5,123,007 | 6/1992 | Miyauchi et al. | 369/100 |
| 5,126,994 | 6/1992 | Ogawa et al. | 369/116 |

FOREIGN PATENT DOCUMENTS

| | | |
|---|---|---|
| 0265849 | 5/1988 | European Pat. Off. |
| 0288114 | 10/1988 | European Pat. Off. |
| 0289004 | 11/1988 | European Pat. Off. |
| 0319102 | 6/1989 | European Pat. Off. |
| 58-143444 | 8/1983 | Japan .................. 369/116 |
| 59-098335 | 6/1984 | Japan .................. 369/116 |

OTHER PUBLICATIONS

Yamada et al., Japanese Journal of Applied Physics, vol. 26 (1987), Supplement 26-4, pp. 61-66.

Primary Examiner—Paul M. Dzierzynski
Assistant Examiner—James Beyer
Attorney, Agent, or Firm—Wenderoth, Lind & Ponack

[57] ABSTRACT

Before a signal is recorded on an optical disk, irradiations are made with plural light irradiation conditions of variable irradiation power or pulse width, optical conditions of irradiated portions are detected by detecting changes in the reflectivity or transmissivity or errors, and the optimum irradiation conditions are determined by comparing the detected results and the light irradiation conditions. In particular, by determining the optimum irradiation conditions in reference to the point where the change in reflectivity or transmissivity is greatest with respect to changes in the irradiation power, the optimum light irradiation conditions can be determined in a short time.

9 Claims, 14 Drawing Sheets

METHOD FOR DETERMINING OPTIMUM IRRADIATION CONDITIONS IN OPTICAL DATA RECORDING

BACKGROUND OF THE INVENTION

1. Field of the Invention

The present invention relates to an optical data medium recording method which records a data signal by means of a laser beam or similar light source, and particularly to a method of obtaining optimum irradiation conditions according to changes in the recording medium and recording device.

2. Description of the Related Art

Technologies for writing or reading a data signal to or from, respectively, an optical data recording medium using a laser beam are already commonly applied in optical disk devices. In the discussion hereinbelow, the data recording medium shall therefore be referred to as an optical disk. These technologies are widely available today as compact discs (hereinafter CDs) and laser video discs, and in write-once optical filing and retrieval systems, Rewritable optical devices have just recently become widely available, though they are still not common.

One available read/write (R/W) system is the so-called phase change disk which utilizes the reversible state capability of certain materials which change between an amorphous and crystalline state or between different crystalline states. The recording thin-films used in these devices assume either an amorphous or distinct crystalline state, and can be switched between these states, by specific heating and cooling conditions induced by a laser beam. In addition, the optical constants (refractive index, extinction coefficient) of these materials change with the amorphous and crystalline states. A data signal is written to the phase-change disk by selectively forming these two states in the recording thin-film according to the data signal, and the signal is read from the disk using the resulting optical changes (transmissivity or reflectivity).

A light irradiation method as shown in FIG. 9 has been proposed as one way to obtain these two states. Described in the Japanese Journal of Applied Physics (Vol. 1.26 (1987), Supplement 26-4, p. 61), this method emits to the recording thin-film on the optical disk a laser beam (b), the power of which is modulated between two power levels, a peak power Pp and a bias power Pb (Pp>Pb) according to the data signal (a). When d laser beam of this type is emitted to the recording thin-film, that part of the film which is radiated by the peak power Pp beam is set to the amorphous state, and that part radiated by the bias power Pb beam is set to the crystal state, regardless of whether the pre-radiation state was amorphous or crystalline. It is therefore possible to overwrite a single spot on the film.

Data is Written to the optical disk by laser beam irradiation 43 thus described. The power levels Pp and Pb which define the laser irradiation conditions are constant levels optimized according to the type of optical disk. However, the optimum irradiation conditions required for any given recording thin-film vary with the passage of time, even for optical disks manufactured under the same conditions, and with variations in the manufacturing conditions. In addition, the power of the laser beam actually reaching the recording thin-film of the optical disk will also vary with soiling of the optical disk surface, or with a change in the operating conditions or with a drop in the transmission efficiency of the optical system in the recording device.

Shown in FIG. 14 is the C/N irradiation power dependency as one example of the changes in an optical disk. The optical disk and irradiation conditions are the same as those described hereinbelow with reference to the first embodiment of the present invention, and only those points related to the changes in the optical disk are described here. Curve A represents the recording characteristics measured at an initial (clean) state, and curve 13 represents the recording characteristics measured after the same optical disk was soiled by exposure for a predetermined period to a dusty environment. In general, the laser power yielding the greatest C/N ratio may be considered to be the optimum conditions for optical disk recording. The results of evaluation during the optical disk manufacturing process correspond to the state represented by curve A where the optimum irradiation power is 10 mw. However, when a signal is recorded with a 10-mW laser power after exposure to the above environment, the C/N ratio drops to a low 30 dB, demonstrating an unacceptable irradiation condition. It should be noted that if the disk surface is similarly soiled an the drive operation changes as described above, the recording state will change even more.

Thus, even if a signal is recorded according to the optimum irradiation conditions measured during optical disk manufacture, the actual recording will differ according to the conditions prevailing when the recording is made. As a result, when the data signal is demodulated from the recording area, the signal may not be correctly demodulated or read errors may be generated.

SUMMARY OF THE INVENTION

Therefore, an object of the present invention is to provide at method for setting the optimum irradiation conditions with respect to the recording medium when recording a data signal.

The method according to the present invention records a data signal by means of laser beam irradiation applied to a recording medium which changes reversibly between optically distinguishable states according to specific light irradiation conditions, and comprises a process for accomplishing before recording the data signal on the recording medium a light irradiation sequence which combines plural different irradiation conditions, a light detection process which detects the quantity of light reflected by or passing through the recording medium after the preceding light irradiation sequences a process which measures said signal, a comparison process which compares the measurement result, and a process which determines the optimum irradiation conditions from the comparison result on record the data signal to the recording medium.

A recording method as thus described can determine the optimum condition from a combination of recording medium and recording device conditions at the time the recording is made. As a result, a recording with a low error rate can be obtained by adapting the irradiation conditions to changes occurring with the passage of time in the recording medium and the recording device.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
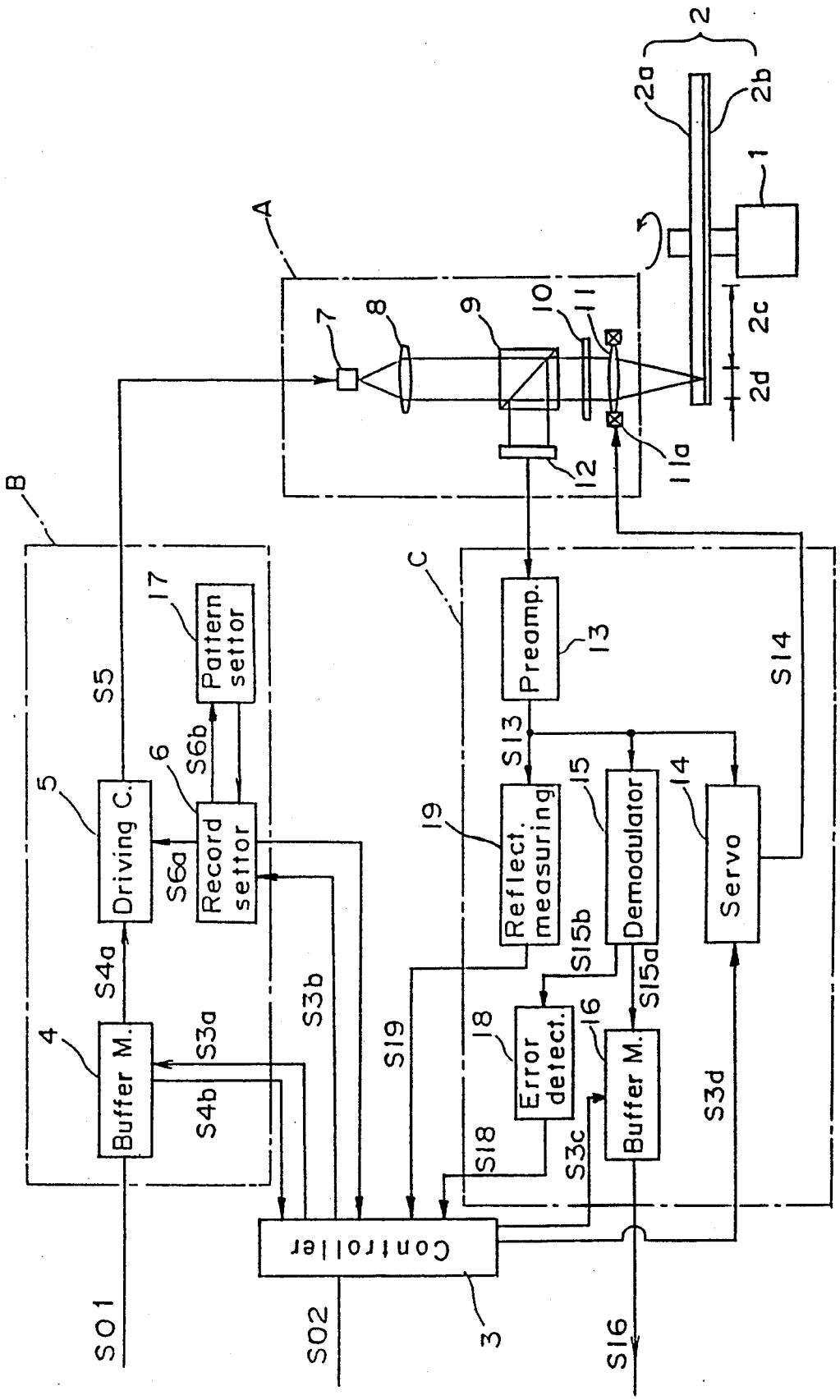
FIG. 1 is a block diagram of a device which may be used to carry out a method for setting the irradiation conditions in a preferred embodiment of the present invention.

FIG. 1 is a block diagram of an optical data recording device comprising a function which determines the irradiation conditions according to a method of the present invention. The operation of each component part thereof is described first below.

This recording device comprises a spindle motor 1 which rotates an optical disk 2, an optical section A for focusing a laser beam on the optical disk 2, a data recording section B which modulates the laser beam, and a playback control section C which reads the data from the optical disk 2 and controls the laser spot. The operation of each circuit is managed by a controller 3.

The optical disk 2 comprises a substrate 2a and a recording layer 2b on the substrate 2a. The surface of the substrate 2a comprises a groove and land structure guide track for trucking, or an address signal for recording position detection. In addition, the optical disk 2 comprises separately from the data area 2c to which the data signal is recorded a test area 2d for setting the light irradiation conditions. The material of the substrate 2a may be polymethyl methacrylate (PMMA), polycarbonate (PC), or a similar regin, or glass. The recording layer 2b to which the signal is recorded by means of light irradiation phase changes may be a GeTe, GeSbTe, InSe, InSeTlCol GeSnTeAu, GeSbTeSep SeSnTOO, SeTeS, or similar amorphous-crystalline state phase change material, or an InSb, AgZn, or similar crystalline-crystalline phase change material. In addition, TbFeCo, GdTbpef, and similar optomagnetic recording materials can also be used.

Figure 9:
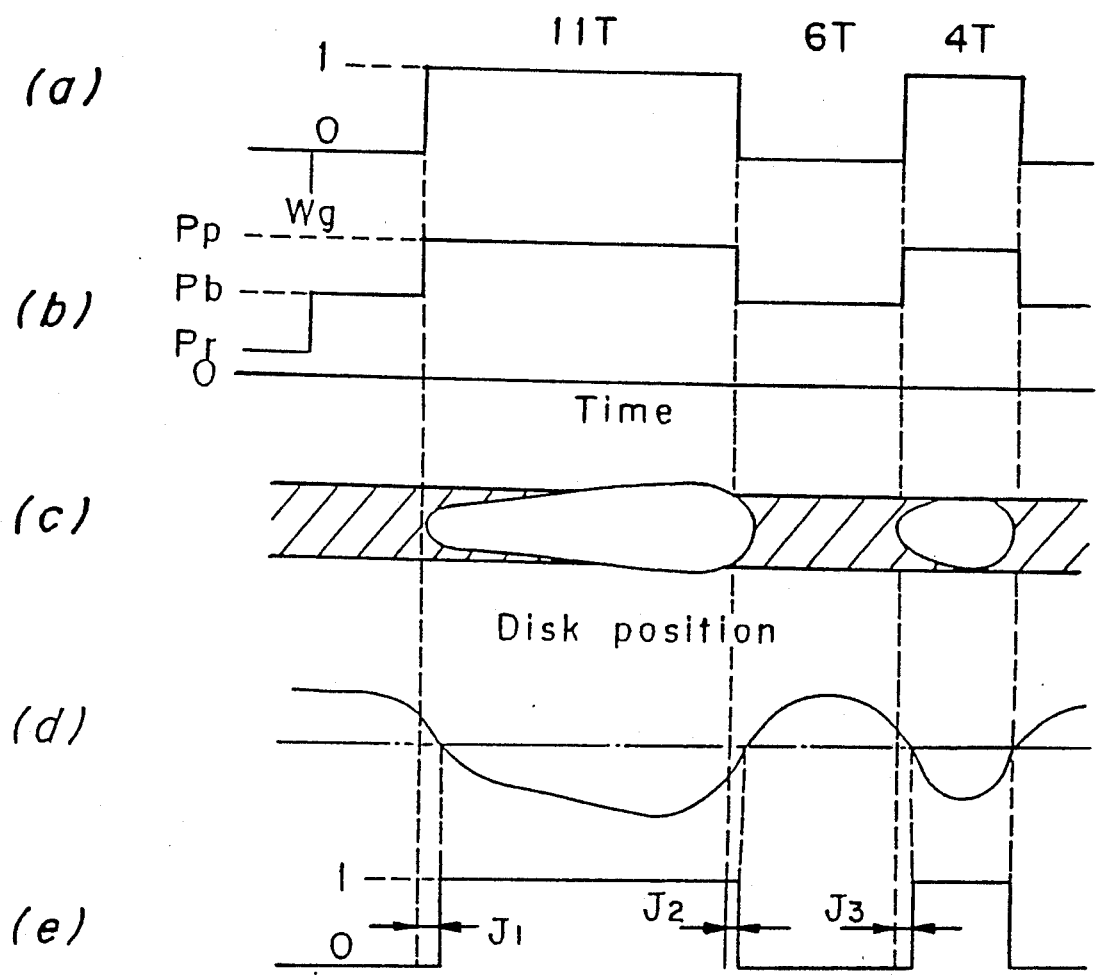
FIG. 9 is a conceptual diagram of a conventional single pulse modulation wave and recording mark shape.

The recording procedure in a regular mode after the irradiation conditions are set is defined below. The data signal SO1 to be recorded on the optical disk 2 is input to the data recording section B, which converts the electrical data signal to a power modulated optical signal, and stored initially in buffer memory 4. The buffer memory 4 outputs a data signal S4a to the drive circuit 5 at a timing determined according to a gate signal S3a from the controller 3. The drive circuit 5 generates a modulated current S5 according to the gate signal S4a and the conditions from the recording setting device 6, and drives the semiconductor laser 7. From the semiconductor laser 7 is generated a light beam power modulated between a peak power Pp and a bias power Pb. The light of the semiconductor laser 7 is regulated to a parallel beam by the collimeter lens 8, passed through a polarization beam splitter 9 and ¼-wave plate 10, and focused by objective lens 11 to an approximately 10 μm spot diameter, which is the wavelength limit, on the recording thin-film 2b of the optical disk 2. By power modulating the focused beam between Pp and Pb according to the data signal, a recording mark (amorphous state) corresponding to the data signal as shown in FIG. 9 (c) is formed on the recording thin-film 2b, thus recording the signal.

During data reading, a continuous beam at a constant read power level Pr is irradiated to the optical disk 2. The reflected light from the recording thin-film 2b passes through the objective lens 11 and ¼-wave plate 10, is reflected by the polarization beam splitter 9 and is thus incident upon the light detector 12, The signal resulting from optoelectric conversion by the light detector 12 is amplified by the preamplifier 13 in the playback control section C. The playback control section C converts the low frequency component of the preamplifier signal S13 to a control signal S14, and drives the voice coil 11a supporting the objective lens 11 for tracking and focusing the laser spot on the optical disk.

The demodulation circuit 15 uses the high frequency component of the signal from the preamplifier 13 to demodulate the data signal resulting from the recording mark formed on the optical disk 2. The demodulated data signal S15a is temporarily stored in the buffer memory 16, and the data signal S16 is output to an external device according to the signal S3c specified from the controller. The device as thus described can thereby record a data signal on an optical disk and read the signal from the recorded area of the disk.

The method whereby the irradiation conditions of the optical disk are set is described briefly below, followed thereafter by a detailed description according to three embodiments of the present invention.

By first inputting to the controller 3 a reference signal 802 which shows that factors causing a change in the condition of the optical disk have occurred, the operation for setting the irradiation conditions of the optical disk is started. The controller 3 outputs irradiation conditions setting mode signals S3b and S3d to the recording setting device 6 and the servo 14, respectively. The servo 14 moves the position of the laser beam to the test area 2d, sequentially reads various recording patterns from the pattern generator 17 by the recording setting device 6, and operates the drive circuit 5 according to these recording patterns. As a result, recording marks which differ according to the irradiation conditions are formed on the optical disk. The irradiation conditions of the recording marks are detected by the DC component of the preamplifier output signal S13 by means of the reflectivity measuring device 19, and the optimum irradiation conditions are determined by the controller 3 through a process of adapting the signal S19, which represents the results of the reflectivity measurement, to the irradiation conditions. It is to be noted that the DC component of the output signal can also be a sum signal of the tracking signal, which is one of the servo signals for the optical disk, or a sum signal of the focusing signal. Regarding methods of evaluating the other irradiation conditions, the error correction signal S15b generated in the data demodulation process and output from the demodulation circuit 15 can be detected by the error detector 18, and the optimum irradiation conditions can be determined by adapting the error signal S18 and the irradiation conditions.

The irradiation conditions are reset by generating the reference signal S02 used in setting the irradiation conditions when factors which change the irradiation conditions of the optical disk occur, or when errors are detected in the actual write/read operation. The actual operating conditions are defined so that the irradiation conditions set signal is generated when the optical disk is changed, when the disk drive is started, when the ambient temperature of the operating environment changes by more than a predetermined amount, when a predetermined period of time has passed after the irradiation conditions are set, or when more than a predetermined number of errors are detected in the read signal. By detecting any changes in the irradiation conditions when the optical disk is replaced or the drive is started, any changes in the disk or the drive or changes relating to both the disk and the drive can be controlled. Furthermore, by monitoring any changes in the temperature of the operating environment and the passage of time after the irradiation condition are set, the temperature dependency of the recording medium and any changes in the control state of the drive can be controlled.

With a recording device as thus described, the irradiation conditions can be set in real time according to a reference signal for setting the optical disk irradiation conditions, data can be reliably recorded under optimum irradiation conditions, and the reliability of the data recording device can be improved.

The present invention is described in further detail hereinbelow with specific reference to the preferred embodiments.

FIRST EMBODIMENT

Figure 2:
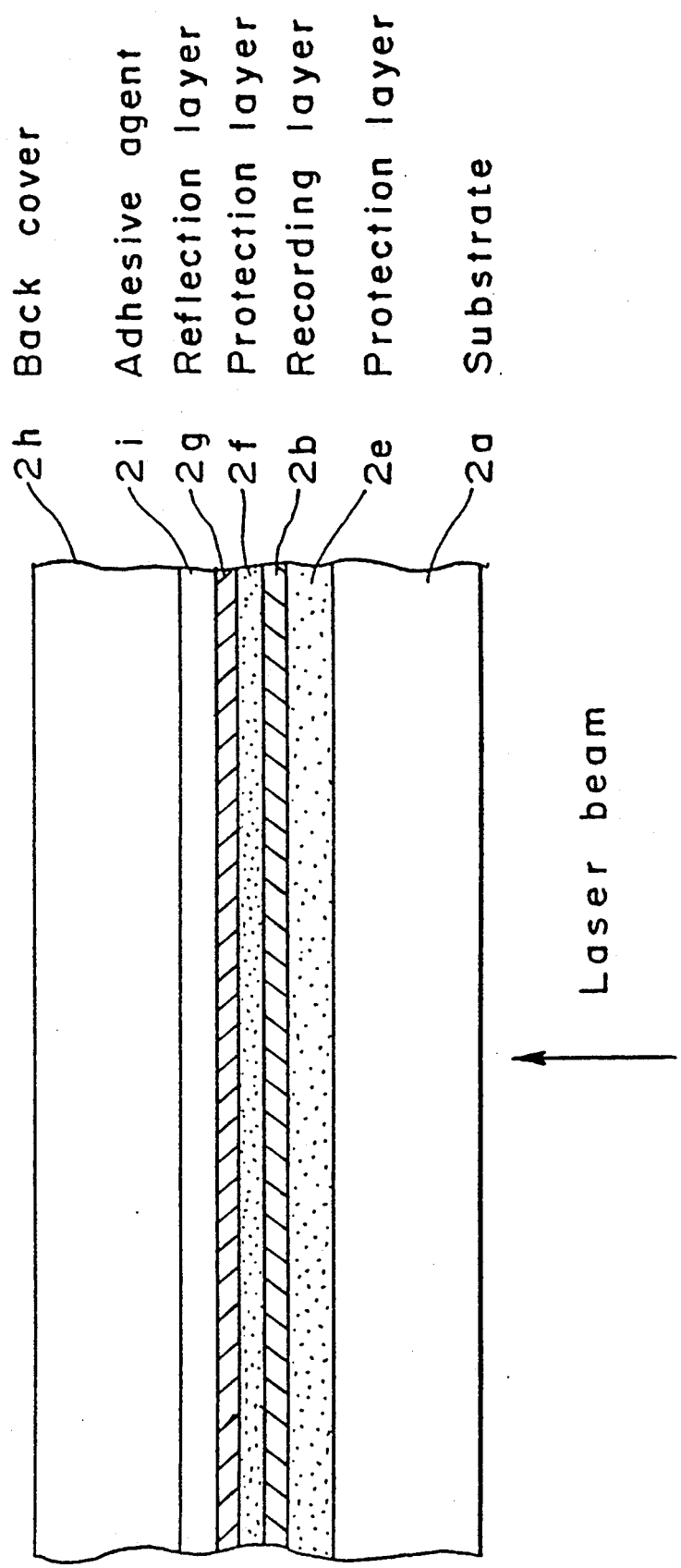
FIG. 2 is a cross section of the optical information recording medium.

FIG. 2 is a cross section of an optical disk used in a first embodiment of the present invention. Over the polycarbonate substrate 2a are sequentially laminated a thin-film protective layer 2e of ZnS, a recording layer 2b of GeSbTe; a thin-film protective layer 2f of ZnS, and a thin-film reflective layer 2g of Au, with a polycarbonate protective plate 2h attached thereto by an adhesive 2i. This optical disk has been rotated at a linear velocity of 1.25 m/sec during recording tests conducted under various light irradiation conditions.

Figure 3A:
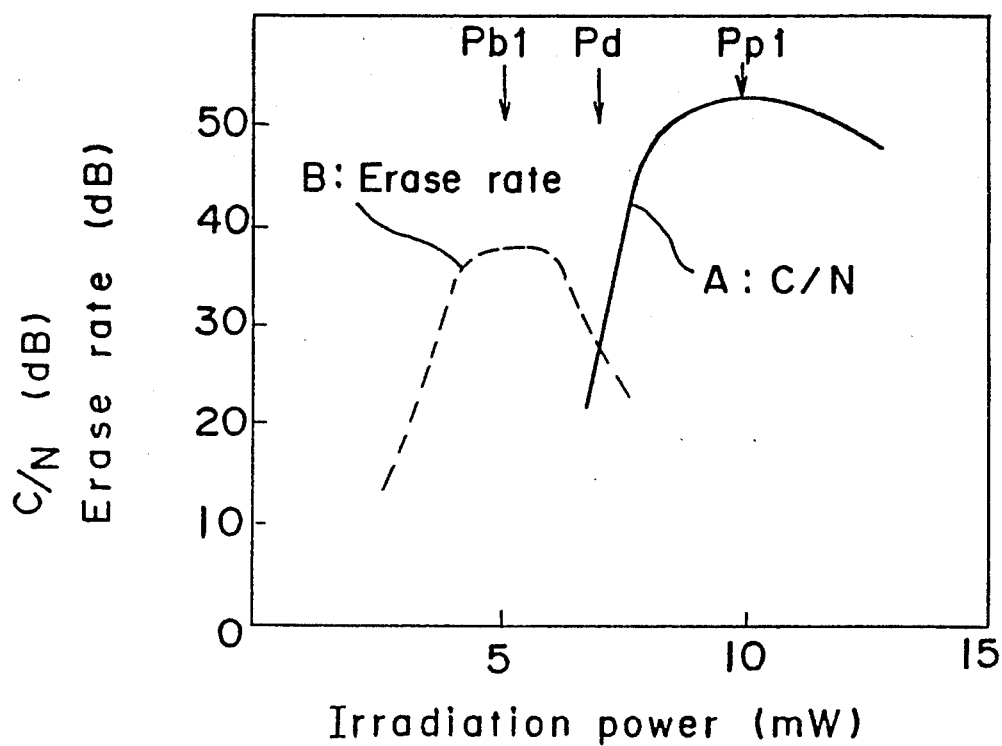
FIGS. 3(a) 3(b) are graphs of the power dependency of the C/N and erasure rate of the recording medium, and the change in reflectivity at DC light irradiation.
Figure 3B:
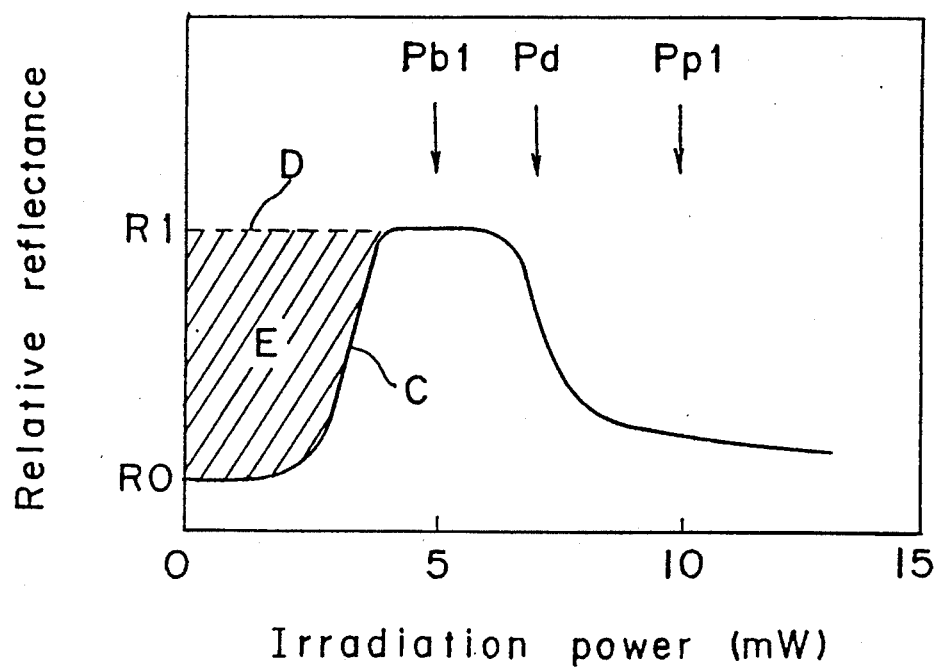

In FIG. 3 (a), a graph of the results of a typical test, curve A shows the C/N power dependency, and curve B shows the erasure rate power dependency. The C/N and erasure rate are commonly used as standards for a simple evaluation of the optical disk irradiation conditions; higher values indicate high signal quality and a correspondingly low probability of read errors in the data signal.

Curve A plots the measured results of the C/N ratio at a 718-kHz modulation frequency, 5-mW constant bias power Pb, and variable peak power Pp. Curve 13 plots the measured results of the C/N ratio for a 718-kHz signal recorded at the preset conditions of Pp=10 mW and Pb=5 mW. The above signals were then overwritten with a 196-kHz signal using a constant 10-mw peak power Pp and a variable bias power Pb, and the extinction rate of the initial 718-kHz signal component was measured as the erasure rate. The curves with the maximum C/N and erasure rate values of 10 mW and 5 mW, respectively, are shown in FIG. 3 (a). Specifically, it is shown in FIG. 3 that a good recording is possible with a 10-mW peak power Pp and 5-mW bias power Pb.

FIG. 3 (b) is a graph showing the measured results of reflectivity when the same disk is irradiated with a continuous power (unmodulated) beam. Solid line C resulted from irradiation of the amorphous state, and dotted line D resulted from irradiation of the crystalline state. The reflectivity of the amorphous state is RO, and that of the crystalline state is R1. The shaded area E represents the range wherein reflectivity can be obtained, i.e. , within this range reftactivity is dependent upon the pre-irradiation state because the laser power is low. When compared with the results shown in rig. 3 (a), a correlation to lager power is observed; specifically, the reflectivity increases at a laser power of approximately 5 mW, the level indicating a high erasure rate, and reflectivity decreases at a laser power of approximately 10 mW, the level indicating a high C/N rate. In general, errors during optical disk recording result from a shift in the laser power as indicated by the curves in FIG. 3 (a) and (b) due to changes in sensitivity with time and variations in the recording medium resulting from the manufacturing conditions.

Figure 4:
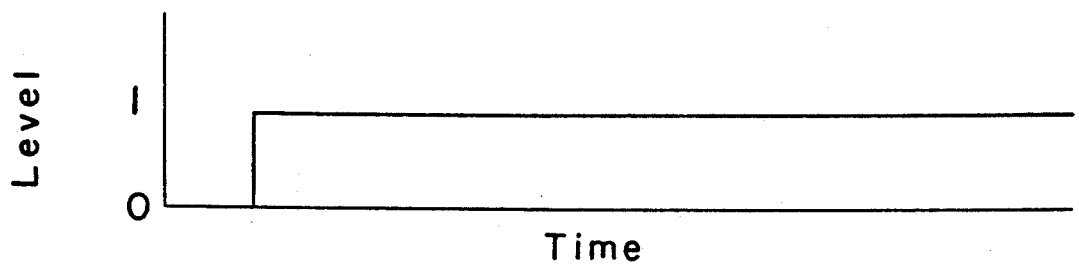
FIGS. 4(a), 4(b) and 4(c) are graphs of the change with time in the irradiation power and reflectivity.
Figure 4:
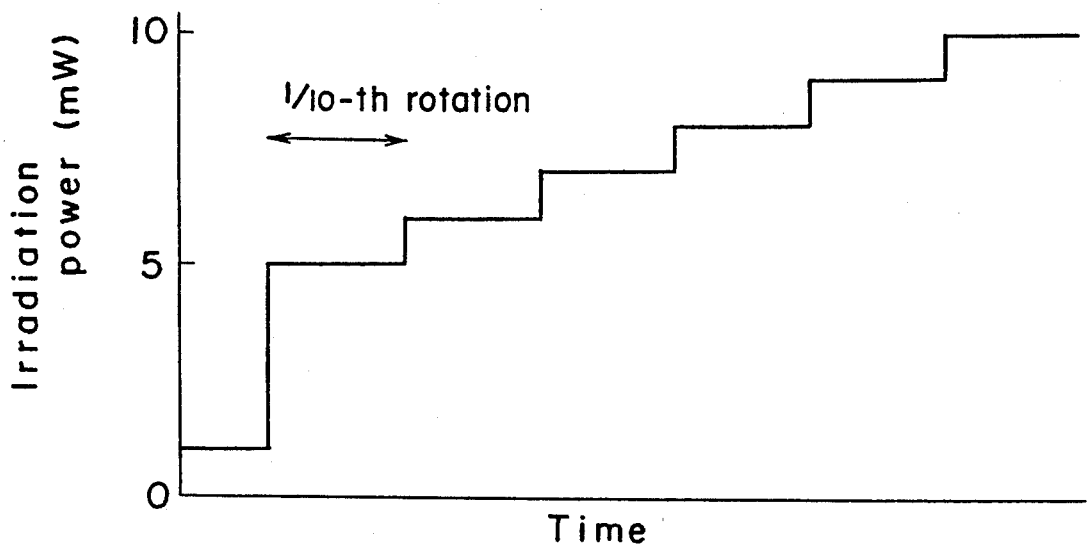
Figure 4C:
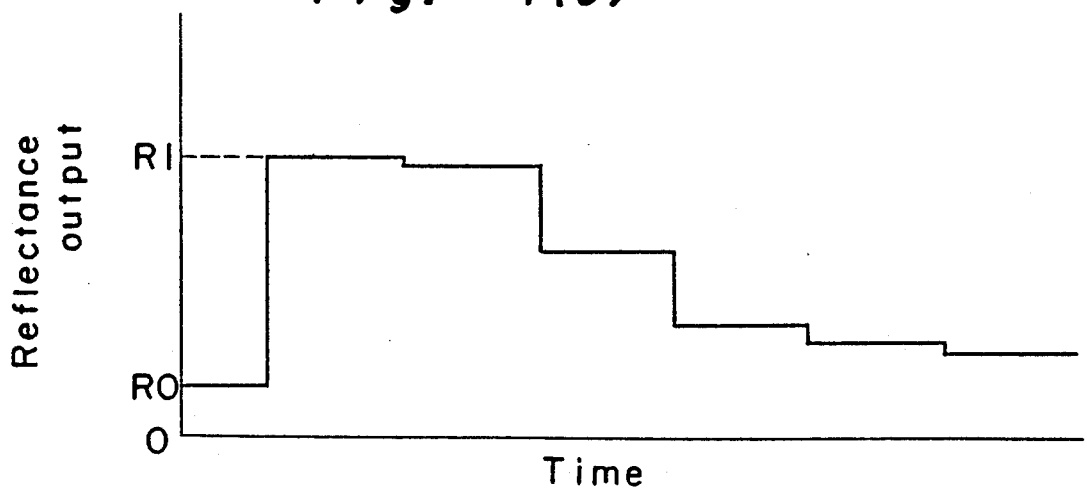
Figure 11:
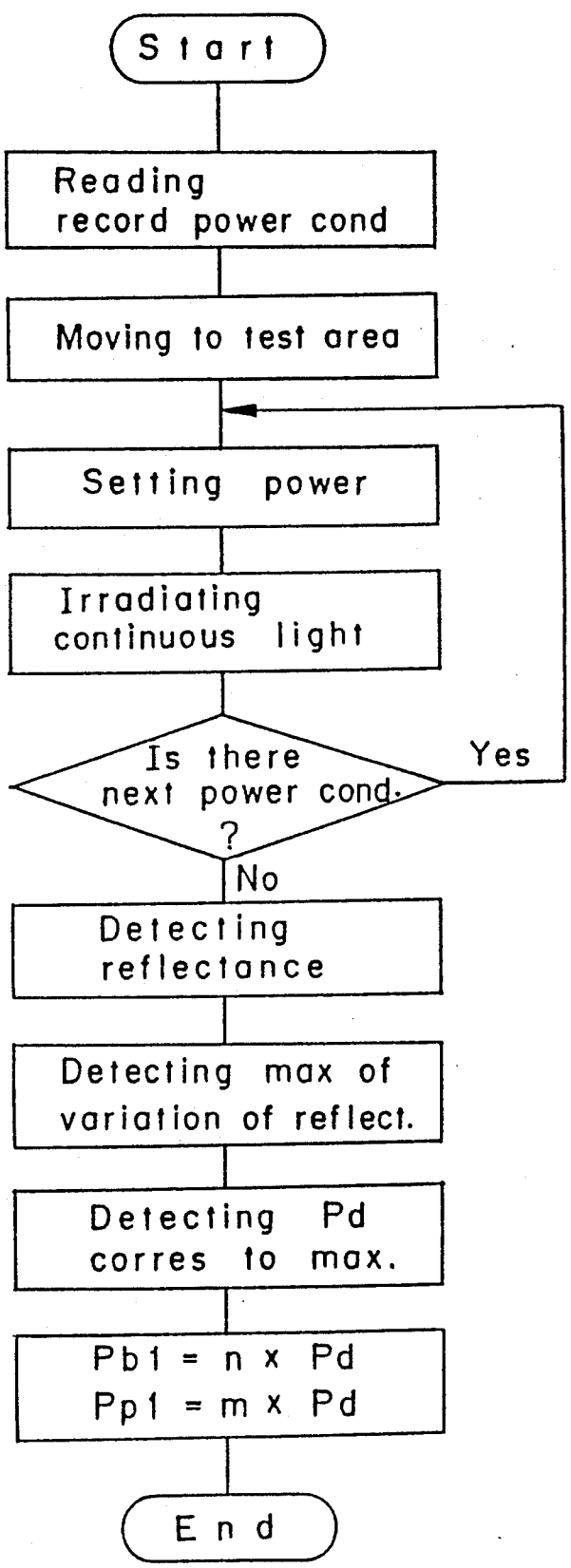
FIG. 11 is a flow chart for a first embodiment of the present invention.

A method according to a first embodiment of the present invention of determining the irradiation conditions of an optical disk using the characteristics shown in FIG. 3 is described hereinbelow using the flow chart shown in is FIG. 11 and the signal waveform as shown in FIG. 4. FIG. 4 (a) is graph of the level of the control signal in the test area for setting the irradiation conditions which is obtained from the optical disk read signal, (b) shows the set power level of the irradiated laser beam, and (c) shows the change in reflectivity in the light irradiated area.

The first step is to record the power conditions of the test recording specified by the controller to the pattern generator 17 through the recording setting device 6 by means of the control signal S3b from the controller for setting the irradiation conditions. For example, the values from 5-10 mW are set in 1 mW increments. The laser beam is then moved by the servo 14 to the test area 2d on the optical disk, and balled on a preformatted signal (e,g., a control signal resulting from the pitch of a pit-land sequence provided in the substrate surface) from the test area, the optical disk is irradiated by the laser beam synchronized to the test start signal (a) according to the conditions indicated by the pattern generator 17. The optical disk is irradiated with a DC light of the power level shown in rig. 4 (b) by the test start signal (a) The drive circuit 5 is driven at a set power of 5 mW at this time, and the power is increased after a predetermined time (e.g., after a 1/10 the rotation of the optical disk). As a results signals are recorded on the disk at ten is different power levels in one complete rotation of the disk.

In the next rotation, the laser power level is set to the read power level Pr, and the reflected light from the recorded portion is detected by the reflectivity measuring device 19, A signal which changes according to the irradiation conditions is obtained as shown in FIG. 4 (c) from the reflectivity measuring device 19, and by comparing this signal level by means of the circuit design or with another value by the controller 31 the power level Pd at which there is the greatest change in reflectivity to the change in laser power is obtained. For example, Pd can be obtained by passing the reflectivity signal through a differentiation circuit and correlating the maximum time of the differentiation signal with the irradiation power. It is to be noted that while ten power levels are used in this example, even more power levels can be set or the power level can be changed continuously so that the waveform shown in FIG. 4 (c) approaches that shown in FIG. 3 (b) to increase the power Pd detection precision. In the present embodiment, the power Pd level with the greatest change is 7 mW.

In a phase-change optical disk, the power level required for phase changes will differ with the recording material and the structure, but a constant relationship is established between the peak power and the erasure power levels within the range of variations in the recording device and changes during the manufacture of the optical disk which are objectives of the present invention. As a result, the relationship between the power Pd at which there is a large change in reflectivity, bias power Pb1 showing the maximum change in erasure rate,, and the peak power Pp1 showing the maximum C/N rate, can be approximated with the following equations.

$$Pb1 = n \times Pd \quad (1)$$

$$Pp1 = m \times Pd \quad (2)$$

By applying these equations, the optimum recording power Pp and Pb can be obtained from the power Pd obtained from the change in reflectivity as described hereinabove. In the present embodiment, because Pb1=5 mW, Pp1=10 mW, and Pd=7 mW, n=0.7 and m=1.4. These values m and n are stored in the pattern generator 17, or these conditions are recorded at the beginning of the test area 2d on the disk, and are read immediately before test signal recording. For example, in the above method, if Pd =10 mW as a result of measuring the change in reflectivity from different disks, then Pb1=7 MW and Pp1=14 MW is obtained from the conditions defined in equations (1) and (2) above. The optimum irradiation conditions for the current optical disk can thus be obtained from a device constructed as described above.

While six irradiation power levels were used in the case of the present embodiment, by setting finer steps in the irradiation power level or by changing the irradiation power continuously, the curve shown in FIG. 3 (b) can be approached. In this case, a more precise power setting is possible by differentiating the reflectivity level and extracting the peak level without comparing the reflectivity values.

SECOND EMBODIMENT

A method of obtaining the optimum recording power by recording a digital signal and evaluating the demodulation signal is described next with reference to the same optical disk used in the first embodiment above.

In this embodiment, an EPM signal containing an audio signal and an error correction code CIRC (cross interleave Reed-Solomon code), this signal being the same as the code signal used in an audio compact disc, is recorded as the code signal S1 in FIG. 1. The read signal from the recording layer of the optical disk is output from the preamplifier,, and is demodulated to an analog audio signal by the demodulation circuit 15. The errors generated in this demodulation process are measured by the error detector 1B.

Figure 5:
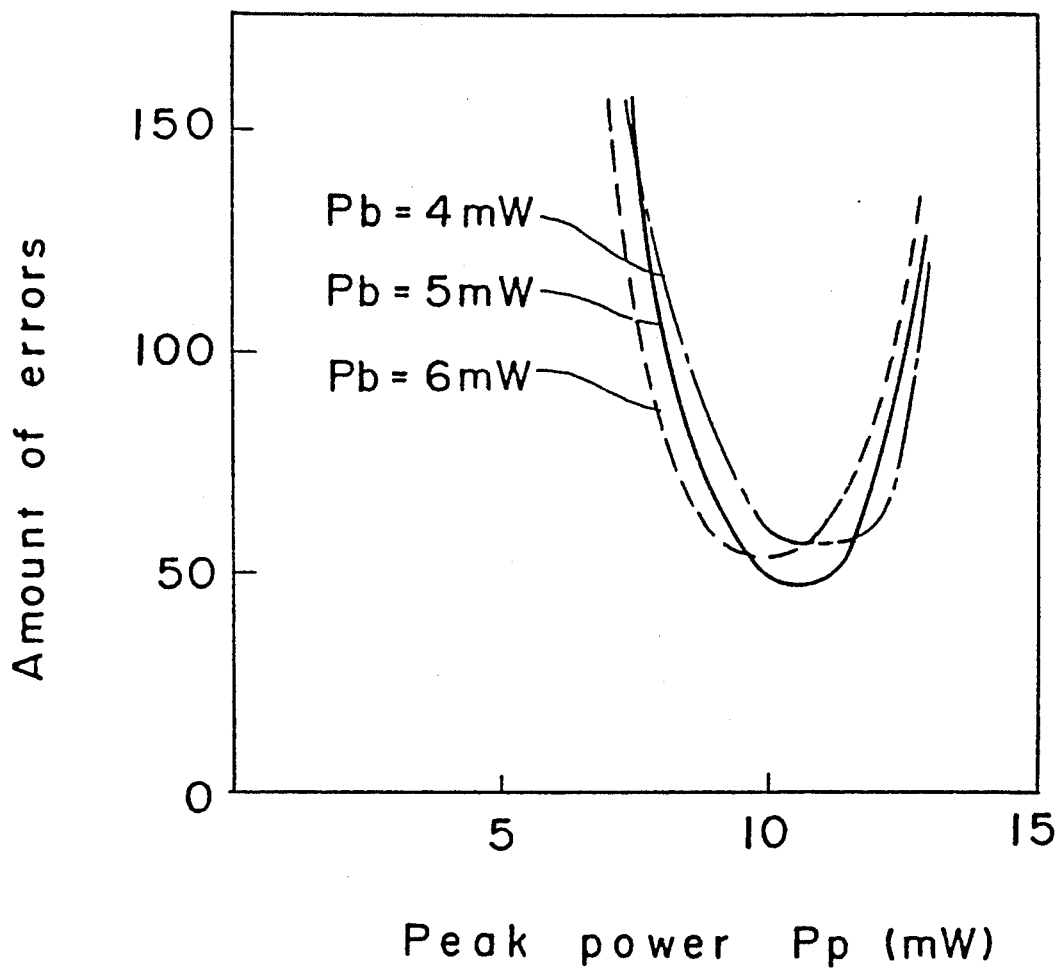
FIG. 5 is a graph of the power dependency of the error quantity.

FIG. 5 is a graph showing the measured results of errors at various power levels used to overwrite a signal at various recording power levels Pp and Pb. The error value used is the number of error correction codes C1, used in the EPM signal, generated per one second. Each curve is the result of measurements made for irradiation with incremental changes in the peak power Pp with a constant bias power Pb. The conditions under which the error count is smallest, indicating optimum irradiation conditions, are dependent upon the bias power Pb With a tendency for the optimum peak power pp to change to a higher value with an increase in the bias power Pb.

Figure 12:
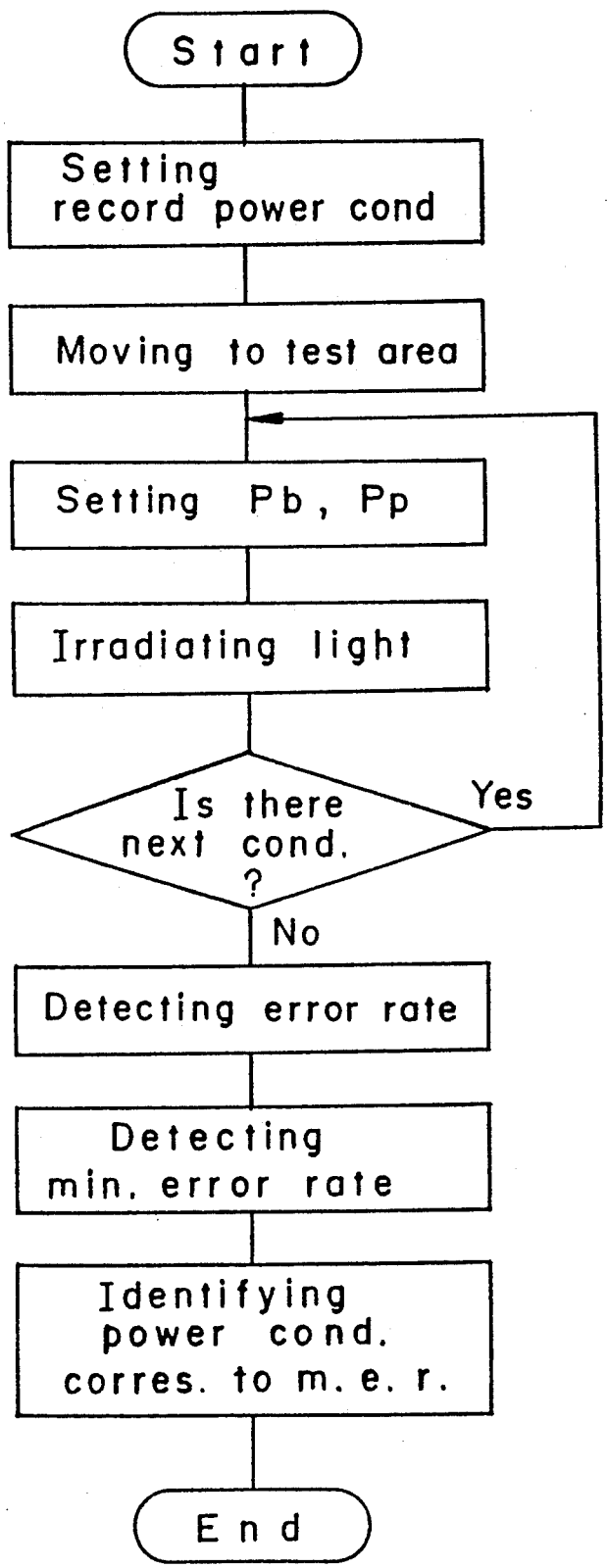
FIG. 12 is a flow chart for a second embodiment of the present invention.

The present embodiment is a method for determining the irradiation conditions of an optical disk using the characteristics shown in FIG. 5, and is described below with reference to the flow chart in FIG. 12.

The first step is to record the power conditions of the test recording specified by the controller to the pattern generator 17 through the recording setting device 6 by means of the control signal S3b from the controller for setting the irradiation conditions. For example, twelve conditions are set: bias power Pb levels 4, 5, and 6 mw, and peak power Pp levels 8, 9, 10,, 11, and 12 mW. The laser beam 15 then moved by the servo 14 to the test area 2d on the optical disk and based on a preformatted signal from the test area, the optical disk is irradiated by the laser beam synchronized to the test start signal according to the conditions indicated by the pattern generator 17.

As the first set of irradiation conditions, the disk is irradiated by the laser beam for a constant period at the power settings Pb=4 mW and Pp−8 mW, followed by recording at a second set of irradiation conditions of $P_b$ 4 mW and Pp=9 mW. The irradiation conditions are thus sequentially changed to record the twelve patterns. Then, the read light from the recording section is demodulated by the demodulation circuit 15, resulting in a code signal from which the errors are detected by the error detector 18. The signal with the smallest number of error is determined f rom the error detection result, thus making it possible to easily identify the position of the signal with the fewest errors, and making it possible, for example, to identify from the time passed after the start of recording the recording power levels Pp and Pb used to record the corresponding low error rate signal. With the optical disk to which the signals measured and graphed in FIG. 5, the smallest number of errors is shown in the signal recorded at Pb=5 mW and Pp=10 mW, indicating that these are the optimum irradiation conditions.

THIRD EMBODIMENT

While the first and second embodiments are methods of obtaining the optimum power level as described hereinabove, the third embodiment relates to a method of obtaining an optimum irradiation pattern by detecting the edge position of the recording mark best suited to the pulse width modulation (PWM) method for reading and writing the signal.

Most current optical disk recording methods are heat mode recording methods which record data by utilizing the phase change, reversal or change in the magnetic orientation of the recording thin-film resulting from a temperature increase caused by absorption of the light incident upon the thin film due to irradiation by a laser beam. Shown in FIG. 9 are the signal distortion, recording mark shape,, and read signal wave resulting from heat mode recording. When the light beam (b) power modulated according to the data signal (a) is irradiated to the optical disk, the heat accumulation effect characteristic of heat mode recording results in a higher temperature at the and of recording compared with the temperature at the beginning of recording. This results in an asymmetrical tear-shaped recording murk which is smaller at the beginning and larger at the end &B shown in FIG. 9 (c). The binary signal (e) obtained from the read signal (d) obtained from the edge positions (start and end points) of this asymmetrical recording mark contains time errors J1, J2, and J3 when compared with the source recording signal (a)t and when these time errors exceed a predetermined level, errors occur during demodulation.

Figure 10:
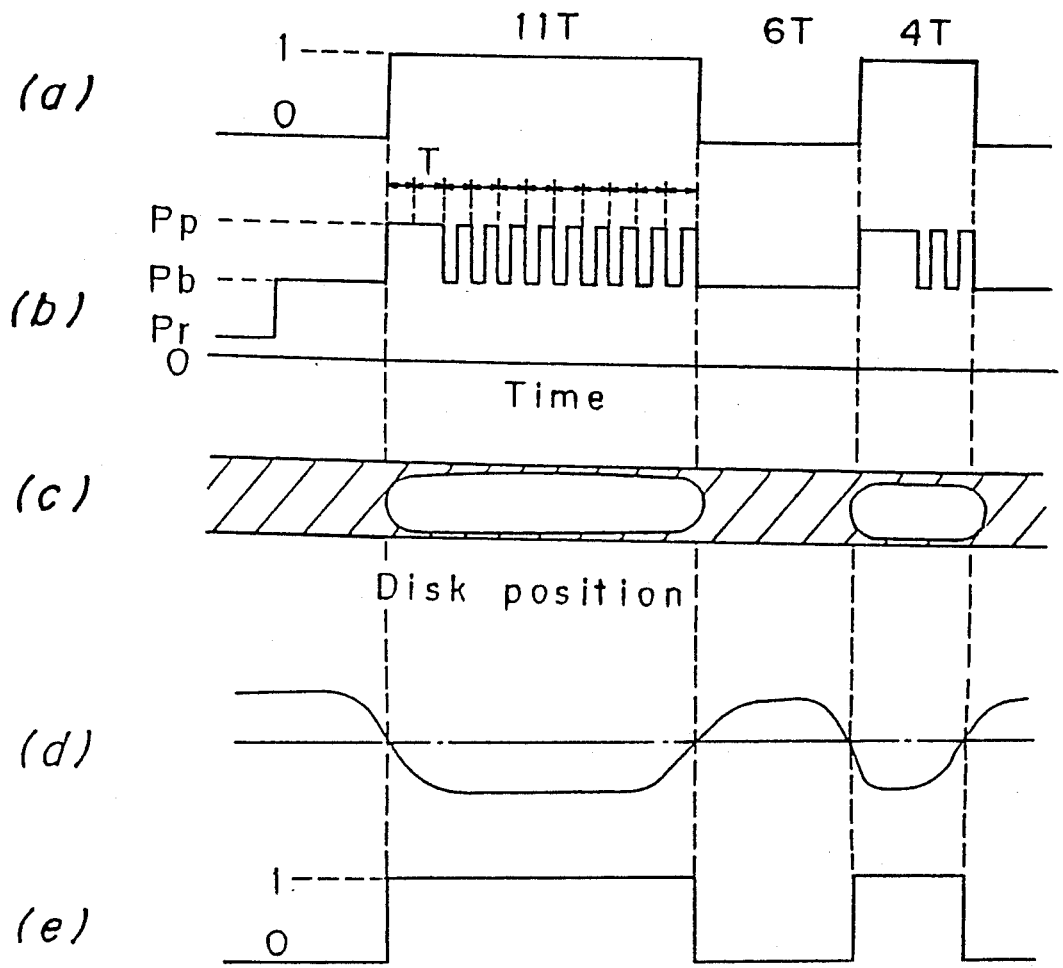
FIG. 10 is a conceptual diagram Of d multiple pulse modulation wave and recording mark shape.

To eliminate this aymmetricality of the recording mark as thus described, in the third embodiment of the present invention, a multiple pulse signal recording method as illustrated in FIG. 10 can be used. In this method, the temperature of the irradiated portion can be controlled by irradiating a light pulse (b) comprising a string of plural pulses for each inverted signal (recording mark) of the data signal (a). By using EL constant pulse power level and varying the pulse width in this light modulated signal, the temperature of the irradiated portion can be freely controlled. Using this multiple pulse method, it is possible to concentrate the light energy at the recording start point, e.g. by increasing the pulse width of the pulse at the start of recording and reducing the interval between pulses, to form a symmetrical recording mark as shown in FIG. 10 (c). As a result, a low distortion read signal (d) and digital signal (e) are obtained, resulting in a recording with a low error rate. However, the optimum conditions of the modulation pattern (b) of this multiple pulse method may differ according to the optical disk and optical disk drive.

Figure 6:
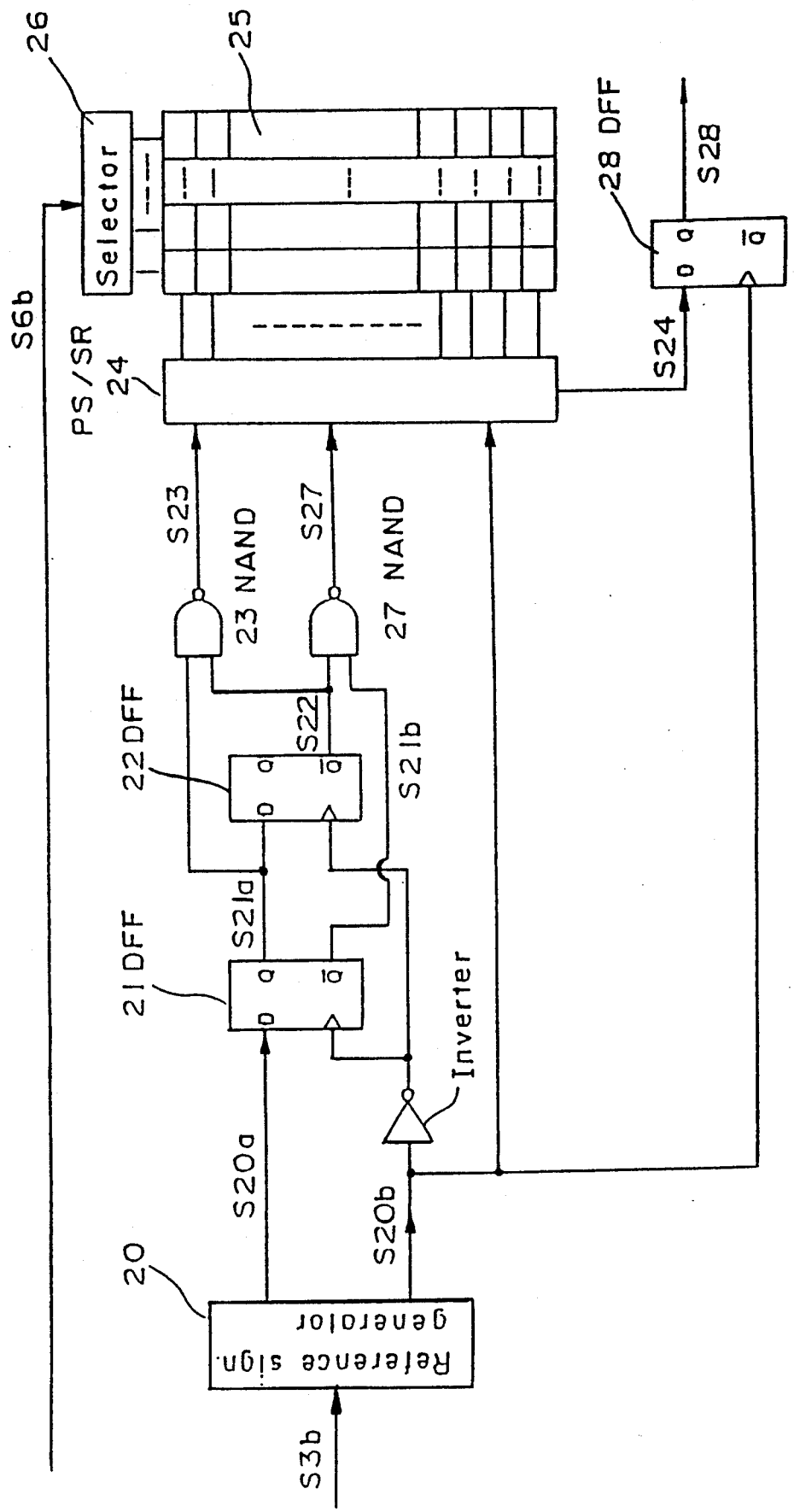
FIG. 6 is a block diagram of a multiple pulse generation circuit.
Figure 7:
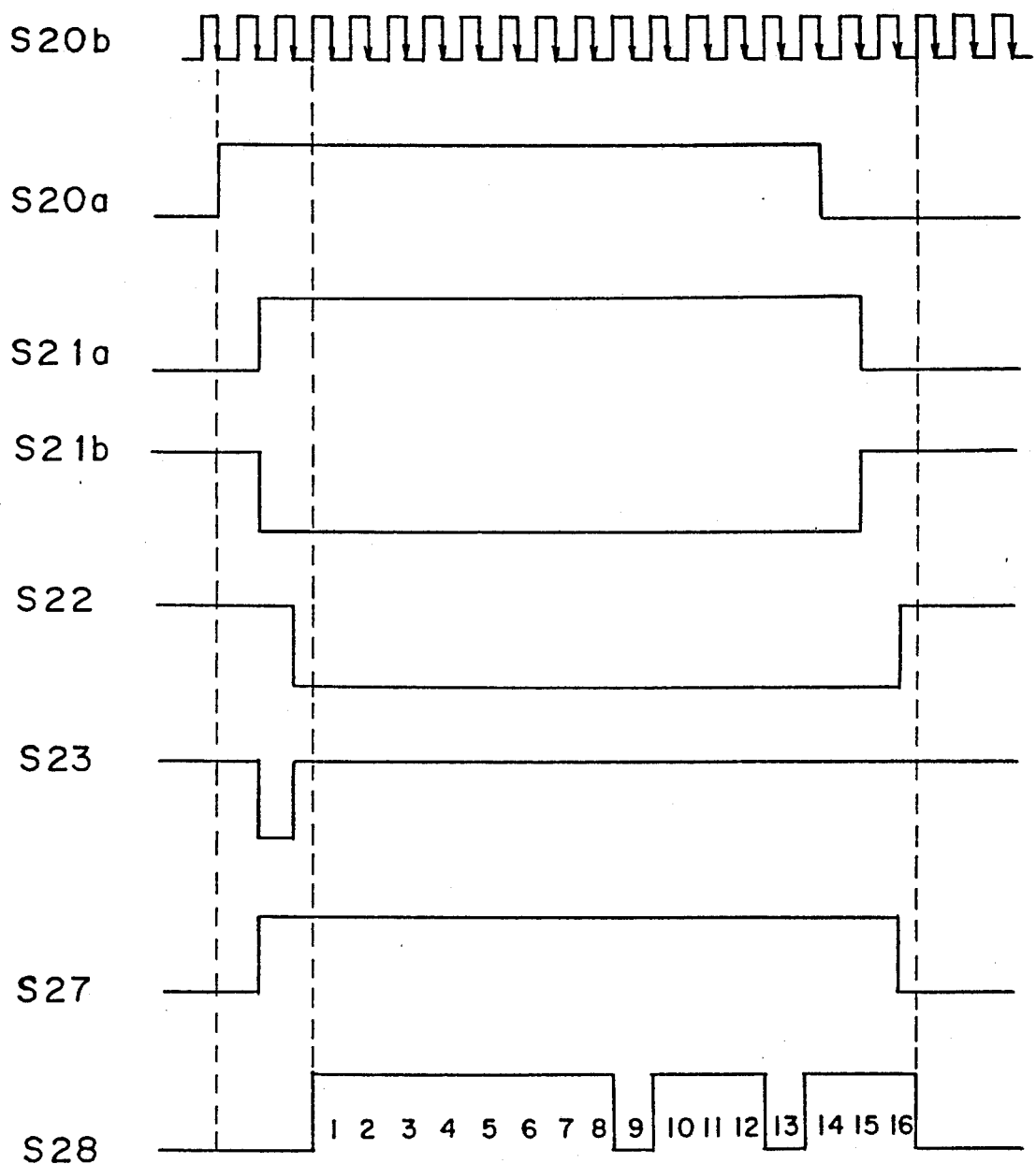
FIG. 7 is a timing chart for the multiple pulse generation circuit.

According to the present invention, a recording pattern optimized for these variable elements can be obtained. FIG. 6 is a block diagram of a device for obtaining an optimized irradiation pattern for the multiple pulse wave according to the recording layer, and FIG. 7 is timing chart of the operation of this device. It is to be noted that the modulation method of this device uses the EFM signal containing the error correction cods CIRC as in the second embodiment of this invention. The primary feature of this circuit is storing in the pattern setting device a pulse string comprising forty-four pulses for the maximum pulse width 11T in this modulation method, and generating a pulse string of the required length from the beginning of the sat pattern according to the pulse width of the input 3T to 11T pulse.

First, the EFM signal S20a and a clock signal S20b with a cycle ¼ the cycle T (=231 nB) of the EFM signal clock signal are output from the reference signal generator 20 (the EFM reference signal in this case) according to a test start signal S3b from the controller 3. It is to be noted that the timing chart in FIG. 7 applies to the multiple pulse modulation of a 4T pulse. When the EPM signal S20a is input, a start signal S23 is generated by data flip-flops DFF21 and DFF22 and the NAND circuit 23, and the parallel/serial out shift register PS/SR 24 operates, The PS/SR 24 calls the set pattern from the pattern setting device 25, and outputs the pattern one step at a time synchronized to the clock S20b.

The pattern setting device 25 is a 44×15 bit ROM device in which fifteen patterns are stored, each pattern having the 44 pulses set HIGH or LOW for correspondence to the maximum pulse width (11T) of the EFM signal. The selector 26 selects the type of the pattern output from the pattern setting device 25 according to the control signal S6b from the recording setting device. A stop signal S27 is then output by the DFF 21, DFF 22, an NAND 27. This stop signal causes an output from step 17 (inclusive) from the PB/SR 24 to stop, resulting in the pulse string of signal S24. It is to be noted that after the pulse string and clock S20b are synchronized again, the DFF 28 outputs the pulse string signal S28 to the drive circuit 5. Finally, a light output as shown in FIG. 10 (b) is obtained from the semiconductor laser 7 for the EFM signal shown in FIG. 10 (a) by the drive circuit 5. Thus, a pulse string can be obtained for pulses of all widths from EFM signals 3T to 11T, and the pulse pattern can be selected from among fifteen different patterns.

Figure 8:
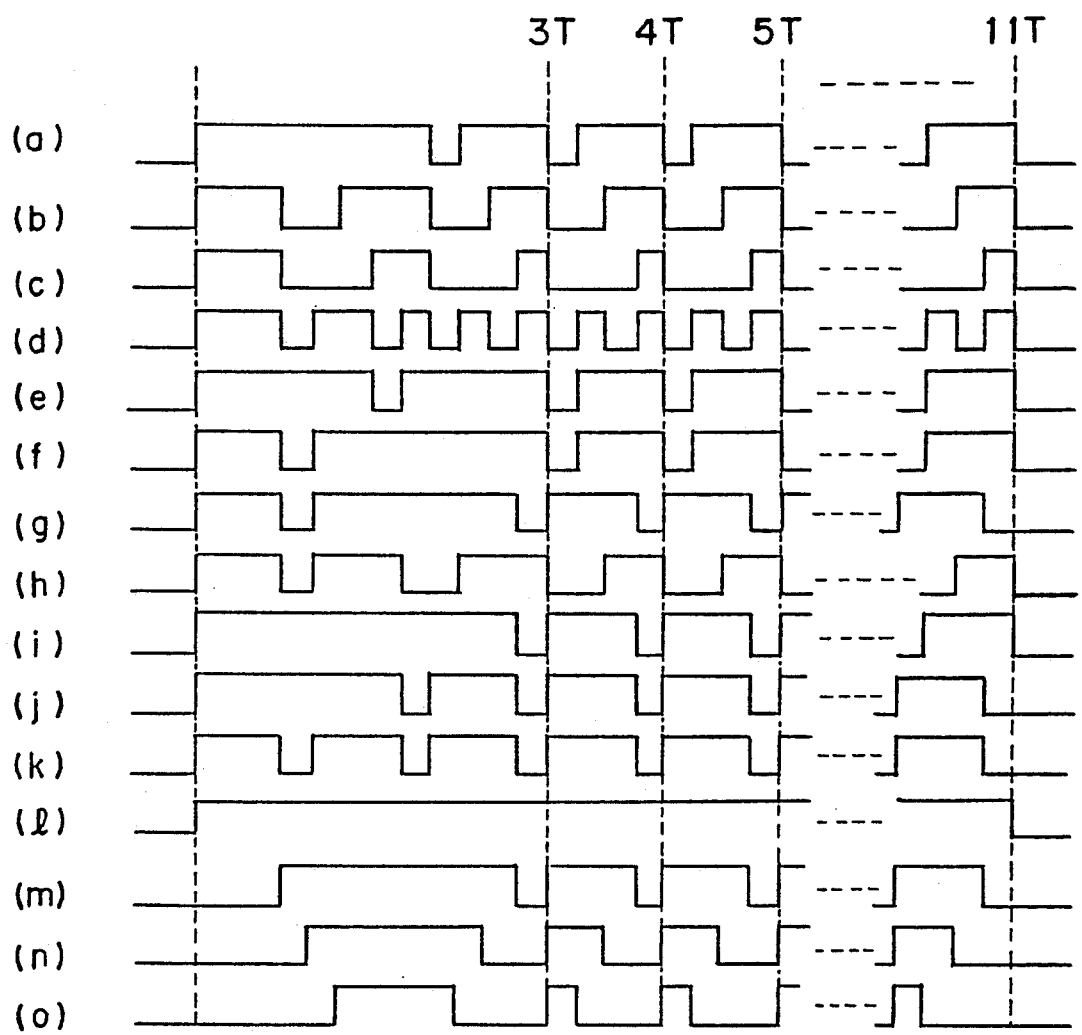
FIG. 8 is a timing chart of the multiple pulse wave of the laser beam.
Figure 13:
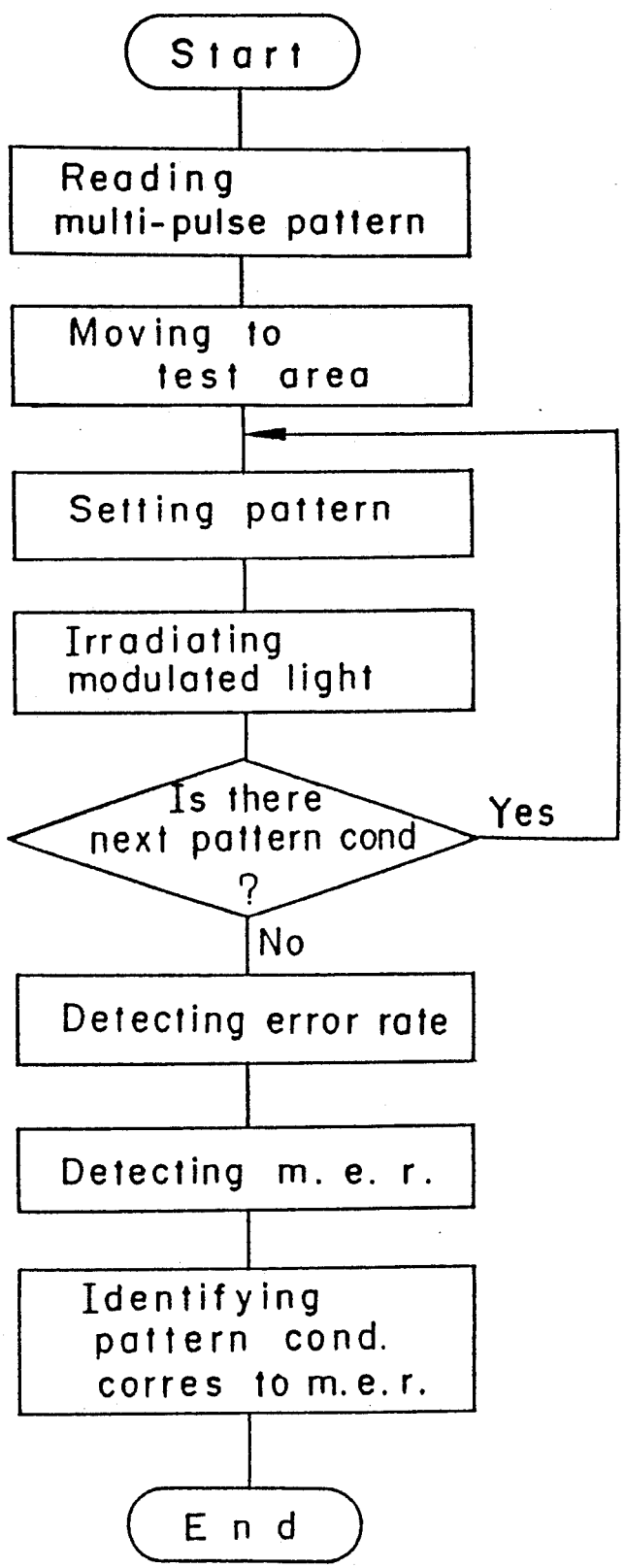
FIG. 13 is a flow chart for a third embodiment of the present invention.
Figure 14:
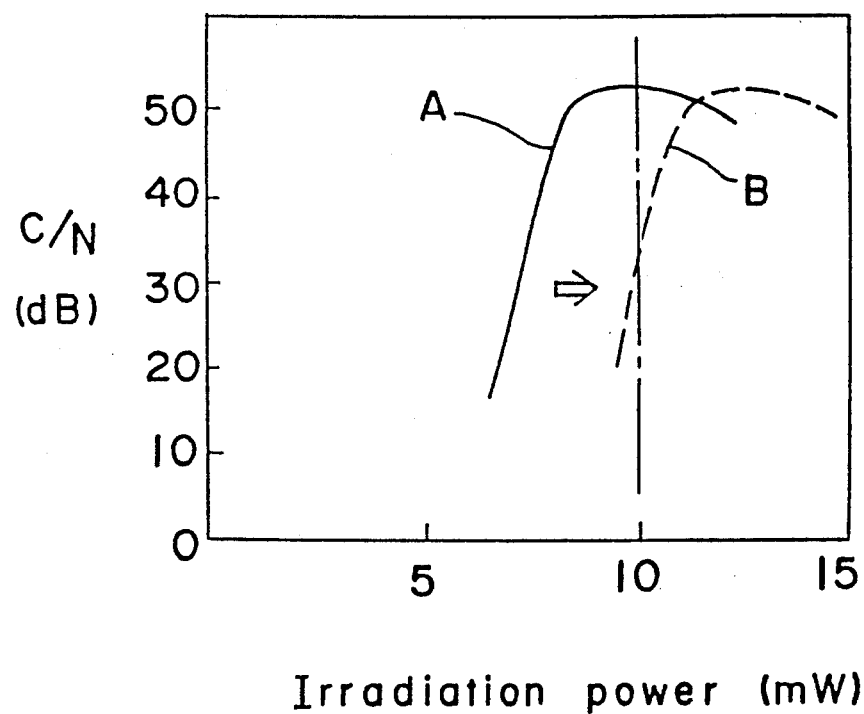
FIG. 14 is a graph of recording power dependency with respect to environmental changes in the optical disk.

The operation of this embodiment is described next with reference to the flow chart in FIG. 13. The first step is to record the patterns of the possible multiple pulse patterns, e.g., the fifteen different patterns as shown in FIG. 8, specified by the controller to the pattern setting means 17 through the recording setting device 6 by means of the control signal S3b from the controller for setting the irradiation conditions. The laser beam is then moved by the servo 14 to the test area 2d on the optical disk, and based on a preformatted signal from the test area, the optical disk is irradiated by the laser beam synchronized to the test start signal according to the conditions indicated by the pattern setting means 17. As a first sat of irradiation conditions, the disk is irradiated by the laser beam for a constant period according to the pattern shown in FIG. 8 (a), followed by recording at a second sat of irradiation conditions according to the pattern shown in FIG. 8 (b). The irradiation conditions are thus sequentially changed to record the fifteen patterns. Then, the light read from the recording section is demodulated by the demodulation circuit 15, resulting in a code signal from which the error quantity is detected by the error detector 18. The signal with the smallest number of errors is determined from the error detection result, and the irradiation pattern can be identified from the recording time from the start of recording of the signal with the smallest number of errors.

For example, the optical disk described above with respect to the first embodiment was spun at a linear velocity of 1.2 m/see, a signal was recorded with a recording power level of peak power Pp=13 mW and bias power Pb=5 mW, and the number of errors in each irradiation pattern was measured. The number of errors obtained for each of the irradiation patterns (a) to (o) in FIG. 8 was: (a) 210, (b) 150, (c)=170, (d)=100, (e)=180, (f)=95, (g)=180 (h)=170, (i)=75, (j)=45, (k)=150, (l)=305, (m)=18, (n)=30, and (o)=130. From these results, the optimum irradiation conditions are defined by pattern (m).

In the embodiments described hereinabove, the methods optimized either the pattern or the irradiation power but irradiation conditions with even higher precision can be set by combining an optimized irradiation power and recording pattern. Furthermore, in the present invention the completion of one complete range of irradiation conditions recorded on the test recording area within one revolution of the disk has been used as one standard, but it is desirable for the irradiation conditions to be set as required, including tests completed in less time or when it is necessary to set a precise high power level.

In the embodiments described hereinabove, evaluation of the error correction quantity was the only method used for evaluation of the data read signal, but other methods including comparison of jitter in the demodulated signal, can be used to obtain the same effect. In addition, a phase-change optical disk medium was used as the recording medium, but the present invention is also effective with heat mode recording methods, and particularly with pulse width modulation recording methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of recording on an optical data medium, said method recording a data signal by means of laser beam irradiation on a recording medium which changes reversibly between optically distinguishable states according to specific light irradiation conditions, and comprising:
a process for accomplishing a light irradiation sequence combining plural different irradiation conditions before the data signal is recorded to the recording medium;
a light detection process which detects the quantity of light reflected by a passing through the recording medium after said light irradiation sequence;
a process of measuring the signal obtained from the light detection process;
a comparison process which compares the measured results;
a process which determines the optimum irradiation conditions from the comparison result; and
a process of recording the data signal using these optimized irradiation conditions;
wherein the irradiation beam is power modulated between at least two power levels, and
wherein said power modulation is accomplished for one recording mark formed on the recording medium according to the data signal by means of a modulation pattern comprising plural pulse strings and selected from among at least two modulation patterns.

2. A method of recording on an optical data medium according to claim 1 wherein the process which accomplishes the light irradiation sequence is performed at an area other than the data write area of the recording medium.

3. A method of recording on an optical data medium according to claim 1 wherein the measuring process is accomplished by detecting a predefined error quantity contained in the signal from the recording medium, and the optimum irradiation conditions are determined from the smallest number of detected errors.

4. A method for recording on an optical data medium, said method recording a signal by means of laser beam irradiation on a recording medium which changes reversibly between optically distinguishable states according to specific light irradiation conditions, and comprising:
a process for irradiating light at different power levels continuously for a predetermined period before recording the data signal on the recording medium;
a process for measuring the changes in the quantity of reflected or transmitted light from or through the recording medium after light irradiation;
a process for comparing the measured results of changes in the reflected or transmitted light quantity;
a process for determining the optimum irradiation conditions of the recording medium by means of the comparison results; and
a process for recording the data signal using the determined optimum irradiation conditions;
wherein as the method for comparing the reflected or transmitted light quantity, the irradiated power at which the change in the reflected or transmitted light quantity is greatest with respect to changes in the irradiated power is defined as the reference power level, and the optimum irradiation conditions are determined by multiplying this reference power level by a constant value.

5. A method of recording on an optical data medium, said method recording a data signal by irradiating a laser beam power modulated between at least two power levels on a recording medium which changes reversibly between optically distinguishable states according to specific light irradiation conditions, and comprising:
a process for irradiating plural light beams on different positions on said recording medium, said plural light beams being obtained by varying at least one of said at least two power levels stepwise in accordance with a specific data signal upon power modulating said laser beam;
a light detection process which detects the quantity of light reflected by or passing through said recording medium after said light irradiation process;
a process of measuring the signal obtained from the light detection process;
a comparison process which compares the measured results;
a process which determines the optimum irradiation conditions from the comparison result; and
a process of recording the data signal using these optimized irradiation conditions;
wherein said specific data signal contains an error correction code, said measuring process is accomplished by detecting a predefined error quantity contained in each of plural signals obtained in said light detection process, wherein the optimum irradiation conditions are determined from the smallest number of detected errors.

6. A method for recording on an optical data medium, said method recording a signal by irradiating a laser beam power modulated between at least two power levels on a recording medium which changes reversibly between optically distinguishable states according to specific light irradiation conditions, and comprising:
- a process for irradiating an unmodulated light beam of which power level is varied stepwise or continuously before recording said data signal on the recording medium;
- a light detection process which detects the quantity of light reflected by or passing through said recording medium after said light irradiation process;
- a process for measuring a direct current component of each signal detected in said light detection process;
- a process for comparing the measured results of changes in the reflected or transmitted light quantity;
- a process for determining the optimum irradiation conditions of the recording medium by means of the comparison results; and
- a process for recording the data signal using the determined optimum irradiation condition;
- wherein said process for determining the optimum irradiation conditions is comprised of detecting the irradiated power at which the change in said reflected or transmitted light quantity is maximum with respect to the change in the irradiated power, said detected irradiated power being defined as the reference power level, and determining said optimum irradiation conditions by multiplying said reference power level by constant values.

7. A method of recording on an optical data medium, said method recording a data signal by irradiating a laser beam on a recording medium which changes reversibly between optically distinguishable states according to specific light irradiation conditions, and comprising:
- a process for irradiating a light beam with plural different irradiation patterns at different positions on said recording medium in accordance with a predetermined information signal;
- a light detection process which detects the quantity of light reflected by or passing through said recording medium;
- a process of measuring signals obtained from said light detection process;
- a comparison process which compares the measured results;
- a process which determines optimum irradiation patterns from the comparison result; and
- a process of recording said data signal using said optimized irradiation patterns;
- wherein said irradiation patterns are accomplished for one recording mark formed on the recording medium by means of plural pulse strings.

8. The method of recording on an optical data medium according to claim 7 wherein said light irradiation process is accomplished by selecting one or plural irradiation patterns in turn each comprising a pulse string stored in a memory and irradiating light beams in accordance with said selected irradiation pattern.

9. A method for recording on an optical data medium according to claim 7 wherein said predetermined information signal includes an error correction code, said measuring process is accomplished by detecting a predefined error quantity contained in each of plural signals obtained in said light detection process, wherein the optimum irradiation conditions are determined from the smallest number of detected errors.

* * * * *